(12) United States Patent
Chavali et al.

(10) Patent No.: US 10,411,836 B2
(45) Date of Patent: Sep. 10, 2019

(54) SYSTEM AND METHOD FOR DETECTING SPATIALLY MULTIPLEXED AND SPACE TIME BLOCK CODED MULTIPLE-INPUT MULTIPLE-OUTPUT (MIMO) SIGNALS

(71) Applicant: Uurmi Systems Pvt Ltd, Telangana (IN)

(72) Inventors: Nanda Kishore Chavali, Telangana (IN); Dharma Teja Bade, Telangana (IN); Mounika Sheela, Telangana (IN); Anusha Kilari, Telangana (IN); Kiran Kumar Kuchi, Telangana (IN)

(73) Assignee: Uurmi Systems PVT. LTD, Hyderabad (IN)

( * ) Notice: Subject to any disclaimer, the term of this patent is extended or adjusted under 35 U.S.C. 154(b) by 0 days.

(21) Appl. No.: 15/462,550

(22) Filed: Mar. 17, 2017

(65) Prior Publication Data

US 2018/0270019 A1   Sep. 20, 2018

(51) Int. Cl.
*H04W 52/02* (2009.01)
*H04L 1/06* (2006.01)
*H04L 1/00* (2006.01)
*H04B 7/0456* (2017.01)
*H04B 7/0417* (2017.01)

(52) U.S. Cl.
CPC ......... *H04L 1/0643* (2013.01); *H04B 7/0417* (2013.01); *H04B 7/0456* (2013.01); *H04L 1/0054* (2013.01)

(58) Field of Classification Search
CPC ............ H04W 52/0209; H04L 1/0643; H04L 1/0054; H04B 7/0417; H04B 7/0456
See application file for complete search history.

(56) References Cited

U.S. PATENT DOCUMENTS

| | | | |
|---|---|---|---|
| 8,064,548 B2 | 11/2011 | Sundberg et al. | |
| 8,082,483 B2 | 12/2011 | Nguyen | |
| 2003/0235149 A1 | 12/2003 | Chan et al. | |
| 2004/0062302 A1* | 4/2004 | Fujii | H04L 1/06 375/232 |

(Continued)

OTHER PUBLICATIONS

Doufexi et al., "Combined Spatial Multiplexing and STBC to Provide Throughput Enhancements to Next Generation WLANs" dated Mar. 19, 2005, 5 Pages.

(Continued)

*Primary Examiner* — Wei Zhao
(74) *Attorney, Agent, or Firm* — Benjamin Balser; Next IP Law Group

(57) ABSTRACT

A system and method for detecting Spatially Multiplexed (SM), Space Time Block Coded (STBC), or Hybrid Space Time Block Coded-Spatially Multiplexed (STBC-SM) Multiple-Input Multiple-Output (MIMO) signals is disclosed. QR decomposition of the MIMO signal is performed. A constellation of symbols present in the MIMO signals is partitioned into subsets of symbols, using a set partitioning technique. A-posteriori probability (APP) of each branch is determined. Log Likelihood Ratios (LLRs) corresponding to the transmitted bits are determined using the a-posteriori probabilities. Successively, transmitted bits are determined by providing the LLRs corresponding to the transmitted bits, to a Viterbi decoder.

24 Claims, 5 Drawing Sheets

(56) References Cited

U.S. PATENT DOCUMENTS

| | | | |
|---|---|---|---|
| 2007/0116143 A1* | 5/2007 | Bjerke | H04L 1/005 |
| | | | 375/262 |
| 2013/0170435 A1* | 7/2013 | Dinan | H04L 45/50 |
| | | | 370/328 |
| 2015/0222457 A1 | 8/2015 | Kaplan et al. | |

OTHER PUBLICATIONS

Lee et al., "An Improved Detection and Transmit Multiplexing Scheme for Hybrid STBC in MIMO-OFDM Systems" dated Jul. 15, 2012, 3 Pages.

Chall, "Iterative receiver for MIMO-OFDM systems based on sphere decoding : convergence, performance and complexity tradeoffs" dated Apr. 11, 2016, 223 Pages.

* cited by examiner

SYSTEM AND METHOD FOR DETECTING SPATIALLY MULTIPLEXED AND SPACE TIME BLOCK CODED MULTIPLE-INPUT MULTIPLE-OUTPUT (MIMO) SIGNALS

FIELD OF THE DISCLOSURE

The presently disclosed embodiments are generally related to detection of Space Time Block Coded (STBC) and Spatially Multiplexed (SM) Multiple-Input Multiple-Output (MIMO) signals.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Modern telecommunication antennas use a Multiple-Input Multiple-Output (MIMO) architecture for exploiting multipath propagation. Using MIMO, multiple signals are transmitted by multiple transmitting antennas at a transmitting end and these transmitted signals are received by multiple receiving antennas at a receiving end. For an efficient communication, the signals are operated by different techniques at the transmitting end. Space Time Block Coding (STBC) and Spatial Multiplexing (SM) are a few of those techniques.

At the receiving end, the signals upon being received by the receiving antenna are processed using different algorithms for detecting data present in the signals. A few of the known algorithms are Maximum a posteriori (MAP) algorithm, Log MAP, Max Log MAP, and Reduced State MAP (RSMAP) algorithms. Above mentioned algorithms inherently use Bahl, Cocke, Jelinek and Raviv (BCJR) algorithm. Usage of these algorithms involves numerous computations. Thus, a specific hardware designed to run a particular algorithm is required for decoding of the data. Further, performance of a system for detecting the data depends on a number of computations performed and a structure of antenna at the transmitting end and the receiving end.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an example embodiment, a method for detecting Spatially Multiplexed (SM) Multiple-Input Multiple-Output (MIMO) signals is described. The method comprises performing QR decomposition of a Multiple-Input Multiple-Output (MIMO) channel matrix (H) of the Spatially Multiplexed (SM) MIMO signals into a matrix Q and a matrix R. The matrix Q is orthonormal and the matrix R is upper triangular in nature. The method further comprises partitioning a constellation of symbols present in the Spatially Multiplexed (SM) MIMO signals into subsets of symbols using a set partitioning technique. Branches are developed upon occurrence of transitions between nodes at multiple stages, in a subset state tree. The symbols present in each of the subsets are represented as the branches. The method further comprises determining a-posteriori probability (APP) of each branch using a forward metric ($\alpha k$), a backward metric ($\beta k$), and a modified branch metric. The modified branch metric uses a path history vector ($p_k$) determined as $p_k = \lceil \hat{x}_{n-k-1} \ p_{k-1} \rceil$. The path history vector ($p_k$) uses equalized soft symbols of a previous state $\hat{x}_{n-k-1}$. The method further comprises determining a-posteriori bit level probabilities for bit-0 and bit-1, using the APP of each branch. The method further comprises determining Log Likelihood Ratios (LLRs) corresponding to the transmitted bits using the a-posteriori bit level probabilities. The method further comprises determining transmitted bits by providing the LLRs corresponding to the transmitted bits, to a Viterbi decoder, thereby detecting the Spatially Multiplexed (SM) Multiple-Input Multiple-Output (MIMO) signals.

In an example embodiment, a method of detecting Space Time Block Coded (STBC) Multiple-Input Multiple-Output (MIMO) signals or Hybrid Space Time Block Coded-Spatially Multiplexed (STBC-SM) Multiple-Input Multiple-Output (MIMO) signals is described. The method comprises determining an effective Multiple-Input Multiple-Output (MIMO) channel matrix (H) of MIMO signals, by rearranging signals received at consecutive time instances and rearranging corresponding channel coefficients of the signals. The method further comprises performing QR decomposition of the effective MIMO channel matrix (H) into a matrix Q and a matrix R. The matrix Q is orthonormal and the matrix R is upper triangular in nature. The method further comprises partitioning a constellation of symbols present in the MIMO signals into subsets of symbols using a set partitioning technique. Branches are developed upon occurrence of transitions between nodes at multiple stages, in a subset state tree. The symbols present in each of the subsets are represented as the branches. The method further comprises determining a-posteriori probability (APP) of each branch using a forward metric ($\alpha k$), a backward metric ($\beta k$), and a modified branch metric. The modified branch metric uses a path history vector ($p_k$) determined as $p_k = \lceil \hat{x}_{n-k-1} p_{k-1} \rceil$. The path history vector ($p_k$) uses equalized soft symbols of a previous state $\hat{x}_{n-k-1}$. The method further comprises determining a-posteriori bit level probabilities for bit-0 and bit-1, using the APP of each branch. The method further comprises determining Log Likelihood Ratios (LLRs) corresponding to the transmitted bits using the a-posteriori bit level probabilities. The method further comprises determining transmitted bits by providing the LLRs corresponding to the transmitted bits, to a Viterbi decoder, thereby detecting the Multiple-Input Multiple-Output (MIMO) signals.

BRIEF DESCRIPTION OF THE DRAWINGS

The accompanying drawings illustrate various embodiments of systems, devices, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise.

Although any systems and methods similar or equivalent to those described herein can be used in the practice or testing of embodiments of the present disclosure, the preferred, systems and methods are now described.

Unless specifically stated otherwise, as apparent from the following discussion, it is appreciated that throughout this specification discussions utilizing terms such as "processing," "performing," "partitioning," "determining," or the like refer to the actions or processes that may be performed by a computing platform, such as a computer or a similar electronic computing device, that is operable to manipulate or transform data represented as physical, electronic or magnetic quantities or other physical quantities within the computing platform's processors, memories, registers, or other information storage, transmission, reception or display devices. Accordingly, a computing platform refers to a system or a device that includes the ability to process or store data in the form of signals. Thus, a computing platform, in this context, may comprise hardware, software, firmware or any combination thereof. Further, unless specifically stated otherwise, a process as described herein, with reference to flowcharts or otherwise, may also be executed or controlled, in whole or in part, by a computing platform.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

It is an object of the current disclosure to provide a system, method and device that enables detection of Space Time Block Coded (STBC) and Spatially Multiplexed (SM) Multiple-Input Multiple-Output (MIMO) signals.

Figure 1:
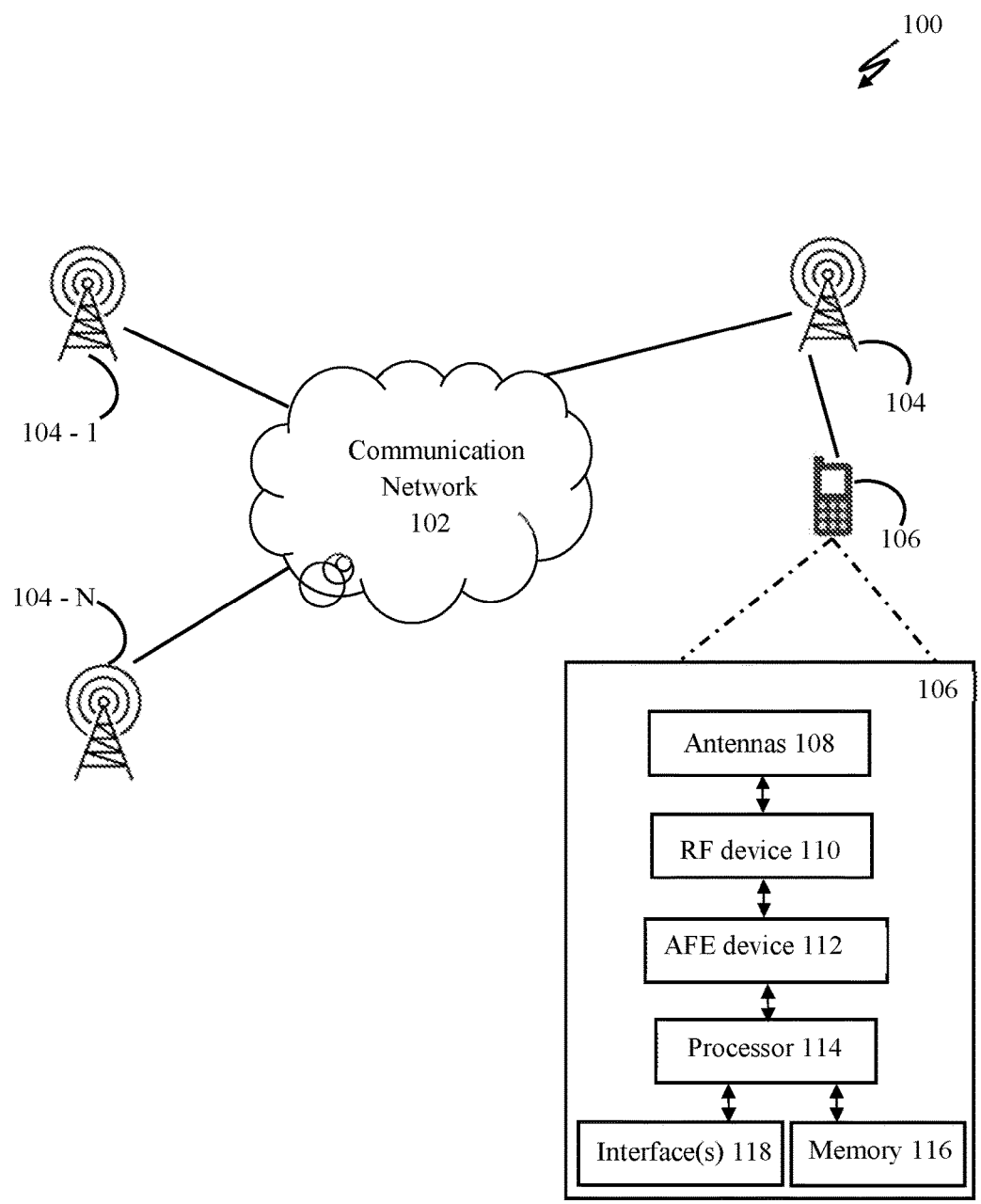
FIG. 1 illustrates network implementation of a Multiple-Input Multiple-Output (MIMO) system 100, in accordance with an embodiment of present disclosure.

FIG. 1 illustrates a network implementation of a Multiple-Input Multiple-Output (MIMO) system 100, in accordance with an embodiment of present disclosure. Several Base Transceiver Stations (BTSs) 104-1-104-N may be connected with each other through a communication network 102. The communication network 102 may be implemented using at least one communication technique selected from Visible Light Communication (VLC), Worldwide Interoperability for Microwave Access (WiMAX), Long term evolution (LTE), Wireless local area network (WLAN), Infrared (IR) communication, Public Switched Telephone Network (PSTN), and Radio waves.

In one embodiment, as illustrated in the FIG. 1, a BTS 104 may be connected to a mobile equipment 106. The BTS 104 and the mobile equipment 106 may communicate using Multiple Input Multiple Output (MIMO) signals. The mobile equipment may comprise a hardware to enable decoding of MIMO signals received from the BTS 104. The hardware may comprise at least antennas 108, a Radio Frequency (RF) device 109A, an Analog Front End device (AFE) 109B, a processor 110, a memory 116, and interface(s) 118.

The processor 110 may execute computer program instructions stored in the memory 116. The processor 110 may also be configured to decode and execute any instructions received from one or more other electronic devices or one or more remote servers. The processor 110 may also execute a client application for desired functioning of the mobile equipment 106. The processor 110 may include one or more general purpose processors (e.g., INTEL microprocessors) and/or one or more special purpose processors (e.g., digital signal processors or Xilinx System On Chip (SOC) Field Programmable Gate Array (FPGA) processor). The processor 110 may be configured to execute one or more computer-readable program instructions, such as program instructions to carry out any of the functions described in this description.

The memory 116 may include a computer readable medium. A computer readable medium may include volatile and/or non-volatile storage components, such as optical, magnetic, organic or other memory or disc storage, which may be integrated in whole or in part with a processor, such as processor 110. Alternatively, the entire computer readable medium may be remote from processor 110 and coupled to processor 110 by connection mechanism and/or network cable. In addition to memory 116, there may be additional memories that may be coupled with the processor 114.

The interface(s) 118 may be used to interact with or program the mobile equipment 106 to achieve desired functionality. The interface(s) 118 may either be Command Line Interface (CLI) or Graphical User Interface (GUI).

In one embodiment, the antennas 108 of the mobile equipment 106 receive Multiple-Input Multiple-Output (MIMO) Radio Frequency (RF) signals. The RF signals may be down-converted to baseband signals using RF device 109A. The baseband signals may be passed through an Analog Front End (AFE) device 109B for obtaining baseband digital MIMO signals (henceforth referred as 'MIMO signals').

In one embodiment, the MIMO signals may be Spatially Multiplexed (SM) MIMO signals. In one example, '$n_r$' receiving antennas may be used to capture the SM MIMO signals transmitted by '$n_t$' antennas. A system model for SM signals for an $n_t \times n_r$ MIMO system may be represented as:

$$y = Hx + n \qquad \text{Equation 1}$$

In above equation 1, H is an MIMO channel matrix of order $n_r \times n_t$. 'y' is the received signal vector with $n_r$ signal streams received on '$n_r$' receiving antennas and is represented as mentioned below.

$$y = [y_1 \, y_2 \ldots y_{n_r}]^T \qquad \text{Equation 2}$$

Further, in the above mentioned equation 1, 'x' is the transmitted signal vector with '$n_t$' signal streams on '$n_t$' transmitting antennas and is represented as mentioned below.

$$x = [a_1 \, a_2 \ldots a_{n_t}]^T \qquad \text{Equation 3}$$

The MIMO channel matrix H is mentioned below in equation 4.

$$H = \begin{bmatrix} h_{11} & h_{12} & \ldots & h_{1n_t} \\ h_{21} & h_{22} & \ldots & h_{2n_t} \\ \vdots & \vdots & \ddots & \vdots \\ h_{n_r 1} & h_{n_r 2} & \ldots & h_{n_r n_t} \end{bmatrix} \overset{SM \ MIMO \ signal \ components}{} \qquad \text{Equation 4}$$

In above mentioned equation 4, 'H' is MIMO channel matrix of order m*n where m=$n_r$ and n=$n_t$.

Further steps will now be described with reference to FIG. 4. The processor 114 may perform QR decomposition of the MIMO channel matrix (H), as shown at step 402. The QR decomposition may be performed as defined by below mentioned equation 5.

$$H = QR \qquad \text{Equation 5}$$

In equation 10, 'Q' is orthonormal matrix and 'R' is an upper triangular matrix. Upon substituting values from equation 5 into equation 1 and multiplying both sides of the equation with $Q^H$, below mentioned equation 6 is obtained.

$$z = Q^H y$$

$$z = Rx + w \qquad \text{Equation 6}$$

In above equation 6, 'z' is an n×1 vector, 'w' is an n×1 vector, and $(\ )^H$ denotes conjugate transpose of a matrix. Bottom 'm-n' rows of 'R' matrix have a zero value in MIMO system with $n_r > n_t$. In 'z' the rows corresponding to the bottom rows of 'H' contains noise only and may thus be ignored. Subsequently, a below mentioned equation 7 is obtained.

$$\begin{bmatrix} z_1 \\ z_2 \\ \vdots \\ z_{n-1} \\ z_n \end{bmatrix} = \begin{bmatrix} r_{11} & r_{12} & \ldots & r_{1n-1} & r_{1n} \\ 0 & r_{22} & \ldots & r_{2n-1} & r_{2n} \\ \vdots & \vdots & \vdots & \vdots & \vdots \\ 0 & 0 & \ldots & r_{n-1n-1} & r_{n-1n} \\ 0 & 0 & \ldots & 0 & r_{nn} \end{bmatrix} \begin{bmatrix} x_1 \\ x_2 \\ \vdots \\ x_{n-1} \\ x_n \end{bmatrix} + \begin{bmatrix} w_1 \\ w_2 \\ \vdots \\ w_{n-1} \\ w_n \end{bmatrix} \qquad \text{Equation 7}$$

In above equation 7, value of the vector 'x' is as shown below:

$$[x_1 \, x_2 \ldots x_n] = [a_1 \, a_2 \ldots a_{n_t}]$$

Post QR decomposition, the processor 114 may employ a set partitioning technique to partition a constellation of symbols present in the SM MIMO signals, as shown at step 404. The constellation of symbols is partitioned into subsets of symbols. Further, the set partitioning technique is employed in such a manner that intra-subset Euclidean distances are maximized. During set partitioning, transitions occur between nodes at multiple stages. Upon occurrence of the transitions, branches develop in a subset state tree. The symbols present in each of the subsets are represented as the branches.

During the set partitioning, a set partition parameter is defined as mentioned below in equation 8.

$$J = [J_n, J_{n-1}, \ldots J_1] \qquad \text{Equation 8}$$

In above mentioned equation 8, $J_i$ corresponds to a number of partitions of a signal set for symbol $x_i$.

Figure 2:
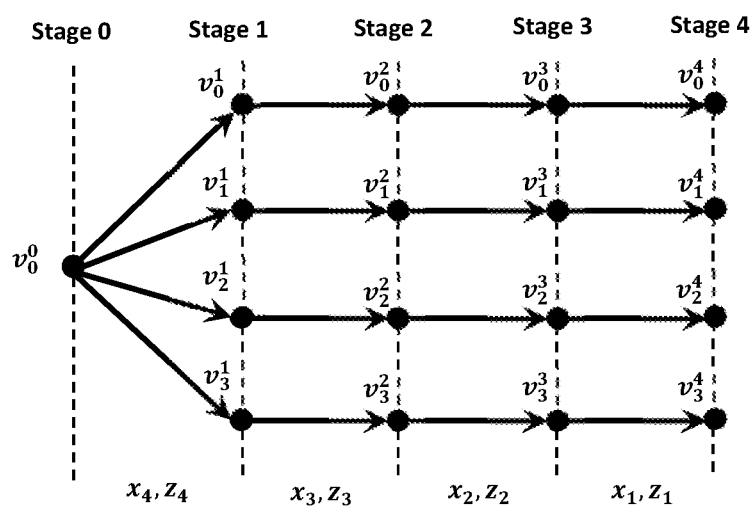
FIG. 2 illustrates a reduced state tree diagram for 4×4 MIMO system for set partitioning [4,1,1,1], according to an example embodiment.

As an exemplary embodiment, FIG. 2 shows a reduced state tree diagram for 4×4 MIMO system, with Quadrature Phase Shift Keying (QPSK) modulation, for set partitioning [4,1,1,1]. Each node of the subset state tree represents a subset state vector, representing subsets of the symbols until that stage. A starting parent node in the subset state tree is denoted as $v_0^0$. Further, another node in the subset state tree indexed as 'i' at a stage 'k' is denoted as $v_i^k$. Here i=1, 2, . . . , $K_k$-1 where $$K_k = \prod_{i=0}^{k-1} J_{n-i}, \, K_0 = 1 \text{ and } k = 0, 1, \ldots, n-1.$$

A set of all possible nodes at a stage k is represented as $S_k = [v_0^k, v_1^k, \ldots, v_{K_k-1}^k]$. A set $\chi_k(i,j)$ refers to a set of all possible input symbols from '$\chi$' resulting into transition from $v_i^k$ to $v_j^{k+1}$. Further, a set of all possible branch transitions from stage 'k' is defined as $B_k = [(i,j): \text{a branch exists between } v_i^k \text{ and } v_j^{k+1}]$.

Subsequent to partitioning of the constellation of symbols, the processor 114 may determine a-posteriori probability (APP) of each branch, as shown at step 406. The processor 114 may determine the a-posteriori probability (APP) using a forward metric ($\alpha k$), a backward metric ($\beta_k$), and a modified branch metric. The a-posteriori probability (APP) of a branch is calculated using a below mentioned equation 9.

$$P(x_{n-k} = x/z) = P(s_{k+1} = v_j, s_k = v_i/z) \forall x \in \chi_k(i,j),$$
$$k = 0, 1, 2, \ldots, n-1 \qquad \text{Equation 9}$$

The processor 114 may determine a probability of occurrence of a transition from state $s_k = v_i$ at a stage 'k' to state $s_{k+1} = v_j$ at stage k+1 using an equation 10, as mentioned below.

$$P(s_{k+1} = v_j, s_k = v_i/z) = P(s_{k+1} = v_j, s_k = v_i, z)/P(z) \qquad \text{Equation 10}$$

In above mentioned equation 10, k=0, 1, 2, . . . n-1. Further, a chain rule of probabilities may be applied in the equation 10 to obtain an equation 11, as mentioned below.

$$P(S_{k+1} = v_j, s_k = v_i, z) = P(s_k, z_n, \ldots, z_{n-k+1}) \cdot$$
$$P(s_{k+1}, z_{n-k}/s_k) \cdot P(z_{n-k-1}, \ldots z_1/s_{k+1}) \qquad \text{Equation 11}$$

The processor 114 may determine a forward metric ($\alpha k$) for $k^{th}$ stage, using below mentioned equation 12. Further, a forward metric for a state '$v_j$' and $(k+1)^{th}$ stage is denoted as $\alpha_{k+1}(v_j)$ and may be calculated using below mentioned equation 13.

$$\alpha_k(s_k) = P(s_k, z_n, \ldots z_{n-k+1}) \qquad \text{Equation 12}$$

$$\alpha_{k+1}(v_j) = \alpha_k(v_i) \cdot \gamma_k(v_i, v_j) \qquad \text{Equation 13}$$

In above mentioned equation 13, i=0, 1, 2, ... $K_k$–1 and j={$iJ_{n-k}$, $iJ_{n-k}$+1, ..., $(i+1)J_{n-k}$–1}.

The processor 114 may also determine a backward metric ($\beta_k$) for $k^{th}$ stage, using below mentioned equation 14. Further, a forward metric for a state '$v_i$' and $k^{th}$ stage is denoted as $\beta_k(v_i)$ and may be calculated using below mentioned equation 15.

$$\beta_{k+1}(s_{k+1}) = P(z_{n-k-1}, \ldots z_1 / s_{k+1}) \qquad \text{Equation 14}$$

$$\beta_k(v_i) = \sum_{j=iJ_{n-k}}^{(i+1)J_{n-k}-1} \beta_{k+1}(v_j) \gamma_k(v_i, v_j) \qquad \text{Equation 15}$$

In above mentioned equation 15, i=0, 1, 2, ... $K_k$–1.

Post computation of the modified branch metric, the processor 114 may compute the forward metric ($\alpha_k$) and the backward metric ($\beta k$), as shown by below mentioned equation 16.

$$P(z_{n-k} / s_k = r_i, x_{n-k} = x) = \frac{1}{\sqrt{2\pi \tilde{\sigma}_{n-k}^2}} \exp\left(-\frac{|z_{n-k} - \langle r_{n-k}, [xp_k] \rangle|^2}{2\tilde{\sigma}_{n-k}^2}\right) \qquad \text{Equation 16}$$

As seen in the branch metric, equation 16, a path history vector ($p_k$) is used. The path history vector ($p_k$) may be determined using below mentioned equation 17.

$$p_k \hat{x}_{n-k-1} p_{k-1}] \qquad \text{Equation 17}$$

Equation 17 shows that the path history vector ($p_k$) uses equalized soft symbols of a previous state ($\hat{x}_{n-k-1}$).

In one embodiment, the processor 114 may determine an equalized soft symbol ($\hat{x}_i$) from a data symbol ($x_i$) and an effective noise ($w_i$), using below mentioned equation 18.

$$\hat{x}_i = x_i + w_i \qquad \text{Equation 18}$$

The effective noise ($w_i$) present in above equation 18 is computed using a below mentioned equation 19.

$$w_i = \sum_{j=i}^{n} k_{ij} \hat{n}_j \qquad \text{Equation 19}$$

In above equation 19, '$k_{ij}$' denotes noise coefficient and '$\hat{n}_j$' denotes effective noise due to soft symbol feedback. The noise coefficient may be computed using equation 20, as provided below.

$$k_{ij} = \begin{cases} 1; & \text{for } i = j \\ 0; & \text{for } i > j \\ -\sum_{m=i+1}^{j} \frac{r_{im} k_{mj}}{r_{mm}}; & \text{for } i < j \end{cases} \qquad \text{Equation 20}$$

Further, a variance ($\tilde{\sigma}_i^2$) of the effective noise for an $i^{th}$ stream is computed using below mentioned equation 21.

$$\tilde{\sigma}_i^2 = E\{w_i^2\} = \sum_{j=i}^{n-f} |k_{ij}|^2 \sigma^2 \qquad \text{Equation 21}$$

In the above mentioned equation 21, 'f' is the number of states having number of set partitions other than 1.

Thus, the processor 114 may determine the a-posteriori probabilities (APPs) using the above mentioned equations 14-26. The APPs calculated above are branch APPs. The processor 114 may determine APPs of transmitted symbols by summing fractions of branch APPs corresponding to a particular input symbol. For example, APPs corresponding to an input symbol $x_{n-k}$=X, is determined using below mentioned equation 22.

$$P(x_{n-k} = x_{pq}/z) = \alpha_k(v_i) P(x_{n-k} = x_{pq}) \\ P(z_{n-k}/s_k = v_i, x_{n-k} = x_{pq}) \beta_{k+1}(v_j) \qquad \text{Equation 22}$$

In the above mentioned equation 22, p=0, 1, 2, ... $K_k$ and q=0, 1, 2, ... (M–1) and $x_{pq}$ is the $q^{th}$ constellation symbol coming from $p^{th}$ node.

Successive to determining the a-posteriori probability (APP) of transmitted symbols, the processor 114 may determine a-posteriori bit level probabilities, as shown at step 408. The a-posteriori bit level probabilities may be determined using the APP of each branch. Further, the processor 114 may determine a-posteriori bit level probabilities for bit-0 and bit-1. For example, a-posteriori bit level probability for bit-1 may be determined using below mentioned equation 23.

$$P(b_{n-k}[l] = 0/z) = \sum_{p} \sum_{q: x_{pq} \in \phi} P(x_{n-k} = x_{pq}/z) \qquad \text{Equation 23}$$

In above equation 23, value of $\phi$ is the set of symbols in which the $l^{th}$ position of binary mapping of symbol x is 0 and l=[0, 1, 2, (log$_2$ M)–1].

Using the a-posteriori bit level probabilities, the processor 114 may determine Log Likelihood Ratios (LLRs) corresponding to the transmitted bits, as shown at step 410. In one case, the LLRs may be determined using a below mentioned equation 24.

$$LLR(b_n(l)) = \ln\left(\frac{P(b_n(l) = 1/z)}{P(b_n(l) = 0/z)}\right) \qquad \text{Equation 24}$$

Successive to determining the LLRs, the processor 114 may determine the transmitted bits as shown at step 412. The LLRs corresponding to the transmitted bits may be provided to a Viterbi decoder. The Viterbi decoder may then provide the transmitted bits corresponding to the Spatially Multiplexed (SM) MIMO signals. Thus, the Spatially Multiplexed (SM) MIMO signals may be detected in an above described manner.

In another embodiment, the antennas 108 of the mobile equipment 106 may receive Multiple-Input Multiple-Output (MIMO) signals. The MIMO signals may be Space Time Block Coded (STBC) Multiple-Input Multiple-Output (MIMO) signals or Hybrid Space Time Block Coded-Spatially Multiplexed (STBC-SM) Multiple-Input Multiple-Output (MIMO) signals. In one example, '$n_r$' receiving antennas may be used to capture the Hybrid Space Time Block Coded-Spatially Multiplexed (STBC-SM) MIMO signals transmitted by '$n_t$' antennas. A system model for i-STBC and j-SM signals for an $n_t \times n_r$ MIMO system may be represented as:

$$[\hat{y}_l \hat{y}_{l+1}] = \hat{H}[\hat{x}_l \hat{x}_{l+1}] + [\hat{n}_l \hat{n}_{l+1}] \qquad \text{Equation 25}$$

In above equation 25, $\hat{H}$ is an MIMO channel matrix of order $n_r \times n_r$. $\hat{y}_l$ and $\hat{y}_{l+1}$, are received signal vectors at $l^{th}$ and $(l+1)^{th}$ time instances, with $n_r$ signal streams received on $n_r$ receiving antennas. Components of the received signal vectors $\hat{y}_l$ and $\hat{y}_{l+1}$ are as shown below.

$$\hat{y}_l y_{l1} y_{l2} \ldots y_{ln_r}]^T \qquad \text{Equation 26}$$

$$\hat{y}_{l+1} y_{(l+1)1} y_{(l+1)2} \ldots y_{(l+1)n_r}]^T \qquad \text{Equation 27}$$

Further, in the above mentioned equation 30, '$\hat{x}_l$' and '$\hat{x}_{l+1}$' are transmitted signal vectors with '$n_t$' signal streams on '$n_t$' transmitting antennas. Components of the transmitted signal vectors $\hat{x}_l$ and $\hat{x}_{l+1}$ are as shown below.

$$\hat{x}_l = [a_{(l-1)1} - a^*_{l1} \ldots a_{(l-1)i} - a^*_{li} a_{(l-1)(i+1)} \ldots a_{(l-1)(i+j)}]^T \qquad \text{Equation 28}$$

$$\hat{x}_{l+1} = [a_{l1} a^*_{(l-1)l} \ldots a_{li} a^*_{(l-1)i} a_{l(i+1)} \ldots a_{l(i+j)}]^T \qquad \text{Equation 29}$$

The transmitted signal vectors '$\hat{x}_l$' and '$\hat{x}_{l+1}$' includes Hybrid Space Time Block Coded-Spatially Multiplexed (STBC-SM) MIMO signal component. Equation 25 could be modified to obtain equation 30, as mentioned below.

$$y = Hx + n \qquad \text{Equation 30}$$

In above mentioned equation 30, values of 'y' and 'x' are as mentioned below.

$$y = [y_n y^*_{(l+1)} \ldots y_{ln_r} y^*_{(l+1)n_r}]^T \qquad \text{Equation 31}$$

$$x = [a_{(l-1)l} - a^*_{l1} \ldots a_{(l-1)i} - a^*_{li} a_{(l-1)(i+1)} \ldots a_{(l-1)(i+j)} \\ a^*_{l(i+1)} \ldots a^*_l(i+j)]^T \qquad \text{Equation 32}$$

The processor 114 may determine an effective Multiple-Input Multiple-Output (MIMO) channel matrix (H) of MIMO signals. The processor 114 may determine the effective MIMO channel matrix by rearranging signals received at consecutive time instances and

rearranging corresponding channel coefficients of the signals. For example, the effective MIMO channel matrix may be as represented below in equation 33.

$$\text{Equation 33}$$

$$H = \begin{bmatrix} h_{11} & -h_{12} & \ldots & h_{1(2i-1)} & -h_{1(2i)} & h_{1(2i+1)} & \ldots & h_{1(2i+j)} & [0]_{1 \times j} \\ h^*_{12} & h^*_{11} & \ldots & h^*_{1(2i)} & h^*_{1(2i-1)} & [0]_{1 \times j} & h^*_{1(2i+1)} & \ldots & h^*_{1(2i+j)} \\ \vdots & \vdots & \vdots & \vdots & \vdots & \vdots & \vdots & \vdots & \vdots \\ h_{n_r 1} & -h_{n_r 2} & \ldots & h_{n_r(2i-1)} & -h_{n_r(2i)} & h_{n_r(2i+1)} & \ldots & h_{n_r(2i+j)} & [0]_{1 \times j} \\ h^*_{n_r 2} & h^*_{n_r 1} & \ldots & h^*_{n_r(2i)} & h^*_{n_r(2i-1)} & [0]_{1 \times j} & h^*_{n_r(2i+1)} & \ldots & h^*_{n_r(2i+j)} \end{bmatrix}$$

In equation 33, 'H' is an effective MIMO channel matrix of order m×n. Here m=$2n_r$ and n=$n_t$+j.

Successive to determining the effective channel matrix, the processor 114 may perform QR decomposition of the MIMO channel matrix (H), partition a constellation of symbols present in the MIMO signals, determine a-posteriori probability (APP) of each branch, determine a-posteriori bit level probabilities, determine Log Likelihood Ratios (LLRs) corresponding to the transmitted bits, and determine the transmitted bits using a Viterbi decoder. The processor 114 may perform the above mentioned steps in a similar manner as explained above using equations 6-24.

Figure 3:
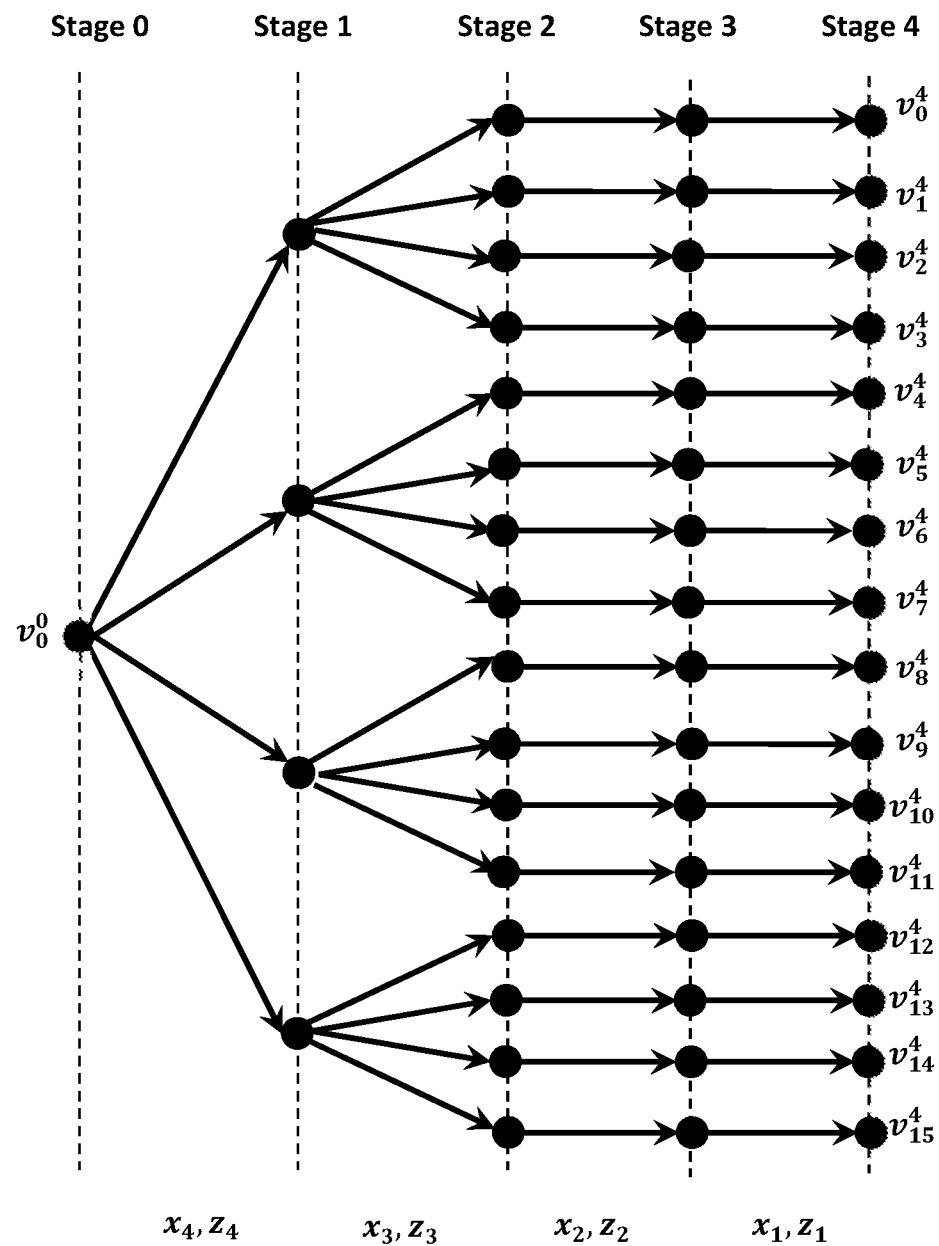
FIG. 3 illustrates a reduced state tree diagram for 4×4 MIMO system for set partitioning [4,4,1,1], according to an example embodiment.

During set partitioning, the processor 114 may set partition a constellation of symbols into a [4,4,1,1] configuration of a subset state tree. FIG. 3 illustrates the reduced state tree diagram for 4×4 MIMO system with QPSK mapping, for set partitioning [4,4,1,1], according to an example embodiment. Further, a method for detecting Space Time Block Coded (STBC) Multiple-Input Multiple-Output (MIMO) signals or Hybrid Space Time Block Coded-Spatially Multiplexed (STBC-SM) Multiple-Input Multiple-Output (MIMO) signals is also explained in a flow chart of FIG. 5.

Figure 4:
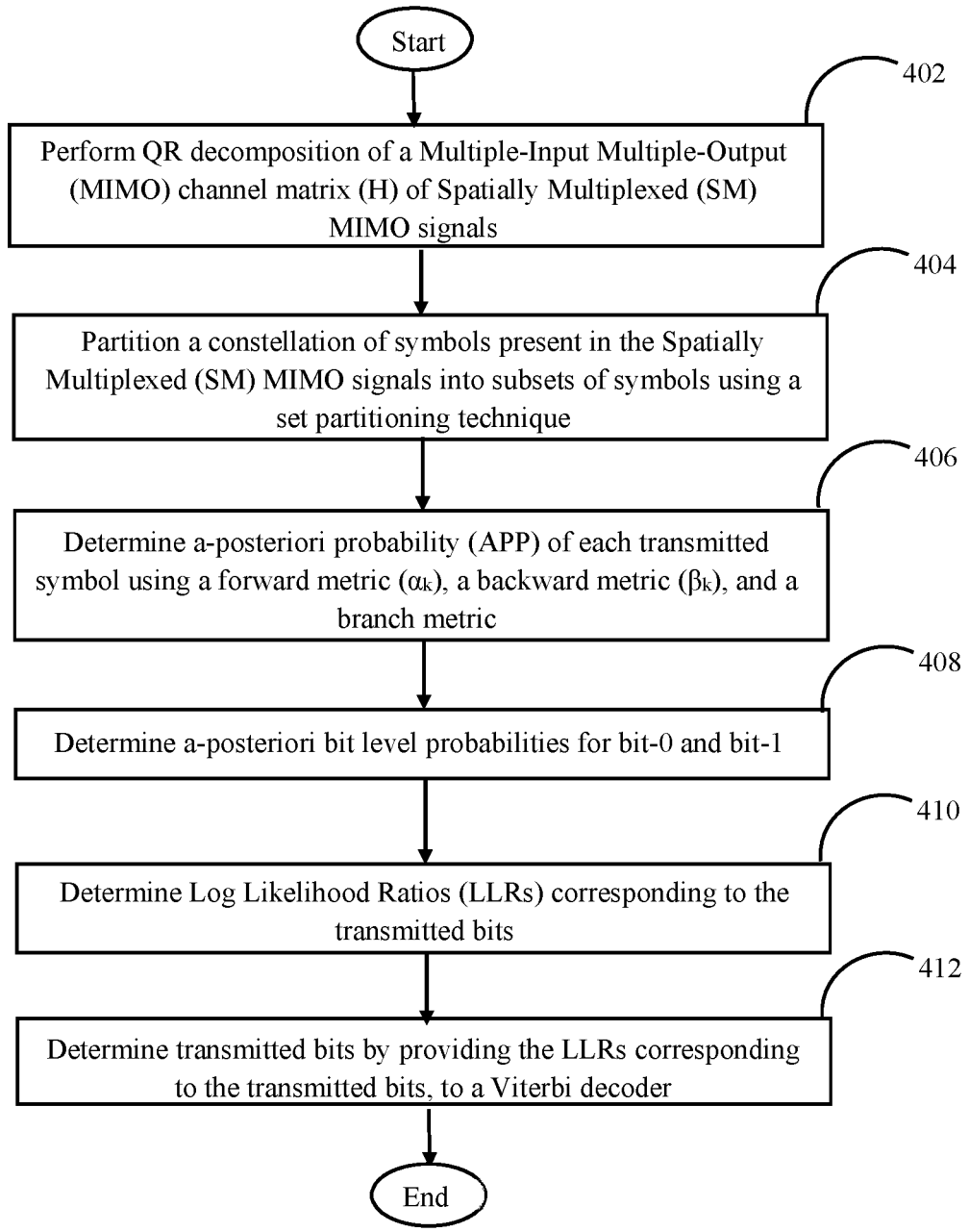
FIG. 4 illustrates a flow chart depicting a method for detecting Spatially Multiplexed (SM) Multiple-Input Multiple-Output (MIMO) signals, according to an example embodiment.
Figure 5:
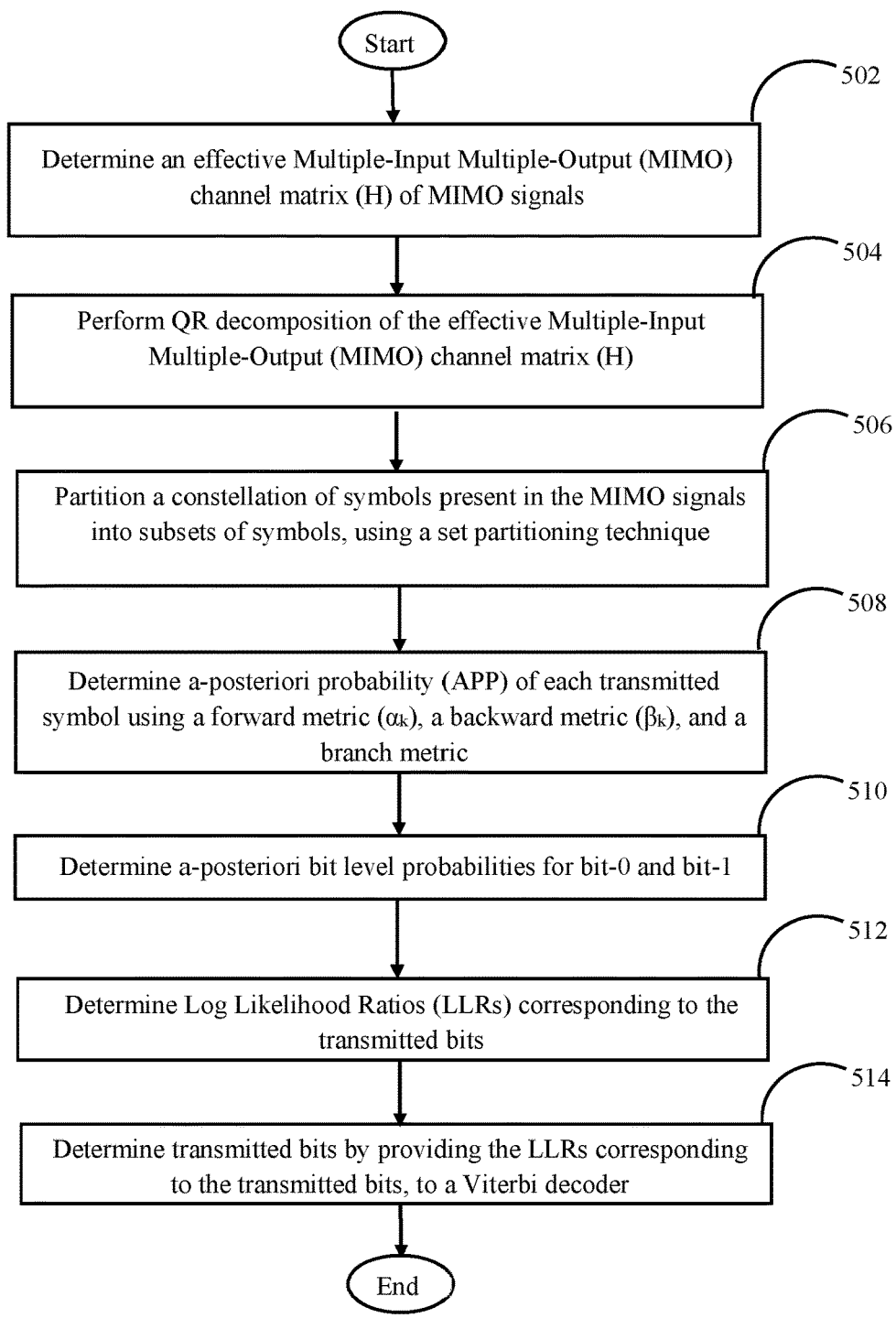
FIG. 5 illustrates a flow chart depicting a method for detecting Space Time Block Coded (STBC) Multiple-Input Multiple-Output (MIMO) signals or Hybrid Space Time Block Coded-Spatially Multiplexed (STBC-SM) Multiple-Input Multiple-Output (MIMO) signals, according to an example embodiment.

The flow charts of FIG. 4 and FIG. 5 show the method steps executed according to one or more embodiments of the present disclosure. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 4 and FIG. 5 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art, a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g. computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for detecting Spatially Multiplexed (SM) Multiple-Input Multiple-Output (MIMO) signals, the method comprising:
    performing, by a processor, QR decomposition of a Multiple-Input Multiple-Output (MIMO) channel matrix (H) of Spatially Multiplexed (SM) MIMO signals into a matrix Q and a matrix R, wherein the matrix Q is orthonormal and the matrix R is upper triangular in nature;
    partitioning, by the processor, a constellation of symbols present in the Spatially Multiplexed (SM) MIMO signals into subsets of symbols, using a set partitioning technique, wherein branches are developed upon occurrence of transitions between nodes at multiple stages, in a subset state tree, and wherein the symbols present in each of the subsets are represented as the branches;
    determining, by the processor, a-posteriori probability (APP) of each branch using a forward metric ($\alpha_k$), a backward metric ($\beta_k$), and a modified branch metric, wherein the modified branch metric uses a path history vector ($p_k$) determined as $p_k=[\hat{x}_{n-k-1}p_{k-1}]$, and wherein the path history vector ($p_k$) uses equalized soft symbols of a previous state $\hat{x}_{n-k-1}$;
    determining, by the processor, a-posteriori bit level probabilities for bit-0 and bit-1, using the APP of each branch;
    determining, by the processor, Log Likelihood Ratios (LLRs) corresponding to transmitted bits using the a-posteriori bit level probabilities; and
    determining, by the processor, transmitted bits by providing the LLRs corresponding to the transmitted bits, to a Viterbi decoder, thereby detecting the Spatially Multiplexed (SM) Multiple-Input Multiple-Output (MIMO) signals.

2. The method of claim 1, wherein the constellation of symbols is a square constellation with gray mapping.

3. The method of claim 1, wherein the modified branch metric is determined as:

$$P(z_{n-k}/s_k = r_i, x_{n-k} = x) = \frac{1}{\sqrt{2\pi\tilde{\sigma}_{n-k}^2}} \exp\left(-\frac{|z_{n-k} - \langle r_{n-k}, [\hat{x}_i p_k]\rangle|^2}{2\tilde{\sigma}_{n-k}^2}\right)$$

wherein, $\tilde{\sigma}_{n-k}^2$ denotes modified noise variance corresponding to $(n-k)^{th}$ stream and 'k'=[0,1,2, ..., n−1].

4. The method of claim 1, wherein determining the path history vector ($p_k$) comprises determining equalized soft symbols ($\hat{x}_i$) using received data symbols ($\hat{z}_i$) and corresponding row vector of the matrix R.

5. The method of claim 4, wherein the set partitioning technique uses a set partitioning vector defined as [M,1,1,1 ... 1(m−1)times] and the matrix R is of order m×m, and wherein M is a size of the constellation.

6. A system for detecting Spatially Multiplexed (SM) Multiple-Input Multiple-Output (MIMO) signals, the system comprising:
    a processor to:
    perform QR decomposition of a Multiple-Input Multiple-Output (MIMO) channel matrix (H) of the Spatially Multiplexed (SM) MIMO signals into a matrix Q and a matrix R, wherein the matrix Q is orthonormal and the matrix R is upper triangular in nature;
    partition a constellation of symbols present in the Spatially Multiplexed (SM) MIMO signals into subsets of symbols using a set partitioning technique, wherein branches are developed upon transition occurrence between nodes at multiple stages, in a subset state tree, and wherein the symbols present in each of the subsets are represented as the branches;
    determine a-posteriori probability (APP) of each branch using a forward metric ($\alpha_k$), a backward metric ($\beta_k$), and a modified branch metric, wherein the branch metric uses a path history vector ($p_k$) determined as $p_k=[\hat{x}_{n-k-1}p_{k-1}]$, and wherein the path history vector ($p_k$) uses equalized soft symbols of a previous state $\hat{x}_{n-k-1}$;
    determine a-posteriori bit level probabilities for bit-0 and bit-1, using the APP of each branch;
    determine Log Likelihood Ratios (LLRs) corresponding to transmitted bits using the a-posteriori bit level probabilities; and
    determine transmitted bits by providing the LLRs corresponding to the transmitted bits, to a Viterbi decoder, thereby detecting the Spatially Multiplexed (SM) Multiple-Input Multiple-Output (MIMO) signals.

7. The system of claim 6, wherein the constellation of symbols is a square constellation with gray mapping.

8. The system of claim 6, wherein the modified branch metric is determined as:

$$P(z_{n-k}/s_k = r_i, x_{n-k} = x) = \frac{1}{\sqrt{2\pi\tilde{\sigma}_{n-k}^2}} \exp\left(-\frac{|z_{n-k} - \langle r_{n-k}, [\hat{x}_i p_k]\rangle|^2}{2\tilde{\sigma}_{n-k}^2}\right)$$

wherein, $\tilde{\sigma}_{n-k}^2$ denotes modified noise variance corresponding to $(n-k)^{th}$ stream and 'k'=[0,1,2, ..., n−1].

9. The system of claim 6, wherein determining the path history vector ($p_k$) comprises determining equalized soft symbols ($\hat{x}_i$) using received data symbols ($\hat{z}_i$) and corresponding row vector of the matrix R.

10. The system of claim 9, wherein the set partitioning technique uses a set partitioning vector defined as [M,1,1 ... 1(m−1)times] and the matrix R is of order m×m, and wherein M is a size of the constellation.

11. A method of detecting Space Time Block Coded (STBC) Multiple-Input Multiple-Output (MIMO) signals or Hybrid Space Time Block Coded-Spatially Multiplexed (STBC-SM) Multiple-Input Multiple-Output (MIMO) signals, the method comprising:
   determining, by a processor, an effective Multiple-Input Multiple-Output (MIMO) channel matrix (H) of MIMO signals, by rearranging signals received at consecutive time instances and rearranging corresponding channel coefficients of the signals;
   performing, by the processor, QR decomposition of the effective MIMO channel matrix (H) into a matrix Q and a matrix R, wherein the matrix Q is orthonormal and the matrix R is upper triangular in nature;
   partitioning, by the processor, a constellation of symbols present in the MIMO signals into subsets of symbols, using a set partitioning technique, wherein branches are developed upon occurrence of transitions between nodes at multiple stages, in a subset state tree, and wherein the symbols present in each of the subsets are represented as the branches;
   determining, by the processor, a-posteriori probability (APP) of each branch using a forward metric ($\alpha_k$), a backward metric ($\beta_k$), and a modified branch metric, wherein the branch metric uses a path history vector ($p_k$) determined as $p_k=[\hat{x}_{n-k-1} p_{k-1}]$, and wherein the path history vector ($p_k$) uses equalized soft symbols of a previous state $\hat{x}_{n-k-1}$;
   determining, by the processor, a-posteriori bit level probabilities for bit-0 and bit-1, using the APP of each branch;
   determining, by the processor, Log Likelihood Ratios (LLRs) corresponding to transmitted bits using the a-posteriori bit level probabilities; and
   determining, by the processor, transmitted bits by providing the LLRs corresponding to the transmitted bits, to a Viterbi decoder, thereby detecting the Multiple-Input Multiple-Output (MIMO) signals.

12. The method of claim 11, wherein the Multiple-Input Multiple-Output (MIMO) signals are Space Time Block Coded (STBC) signals.

13. The method of claim 11, wherein the Multiple-Input Multiple-Output (MIMO) signals are Hybrid Space Time Block Coded-Spatially Multiplexed (STBC-SM) signals.

14. The method of claim 11, wherein the constellation of symbols is a square constellation with gray mapping.

15. The method of claim 11, wherein the modified branch metric is determined as:

$$P(z_{n-k}/s_k = r_i, x_{n-k} = x) = \frac{1}{\sqrt{2\pi\tilde{\sigma}_{n-k}^2}} \exp\left(-\frac{|z_{n-k} - \langle r_{n-k}, [\hat{x}_i p_k]\rangle|^2}{2\tilde{\sigma}_{n-k}^2}\right)$$

wherein, $\tilde{\sigma}_{n-k}^2$ denotes modified noise variance corresponding to $(n-k)^{th}$ stream and 'k'=[0,1,2, ..., n−1].

16. The method of claim 11, wherein determining the path history vector ($p_k$) comprises determining equalized soft symbols ($\hat{x}_i$) using received data symbols ($\hat{z}_i$) and corresponding row vector of the matrix R, and wherein determining the equalized soft symbols ($\hat{x}_i$) comprises determining an effective noise ($w_i$) for fourth stage due to a soft symbol feedback.

17. The method of claim 16, wherein the set partitioning technique uses a set partitioning vector defined as [M,M,1,1 ... 1(m−2) times] for the matrix R of order m×m.

18. A system for detecting Space Time Block Coded (STBC) Multiple-Input Multiple-Output (MIMO) signals or Hybrid Space Time Block Coded-Spatially Multiplexed (STBC-SM) Multiple-Input Multiple-Output (MIMO) signals, the system comprising:
   a processor to:
   determine an effective Multiple-Input Multiple-Output (MIMO) channel matrix (H) of MIMO signals by rearranging signals received at consecutive time instances and rearranging corresponding channel coefficients of the signals;
   perform QR decomposition of the effective MIMO channel matrix (H) into a matrix Q and a matrix R, wherein the matrix Q is orthonormal and the matrix R is upper triangular in nature;
   partition a constellation of symbols present in the MIMO signals into subsets of symbols using a set partitioning technique, wherein branches are developed upon occurrence of transitions between nodes at multiple stages, in a subset state tree, and wherein the symbols present in each of the subsets are represented as the branches;
   determine a-posteriori probability (APP) of each branch using a forward metric ($\alpha_k$), a backward metric ($\beta_k$), and a modified branch metric, wherein the branch metric uses a path history vector ($p_k$) determined as $p_k=[\hat{x}_{n-k-1} p_{k-1}]$, and wherein the path history vector ($p_k$) uses equalized soft symbols of a previous state;
   determine a-posteriori bit level probabilities for bit-0 and bit-1, using the APP of each branch;
   determine Log Likelihood Ratios (LLRs) corresponding to transmitted bits using the a-posteriori bit level probabilities; and
   determine transmitted bits by providing the LLRs corresponding to the transmitted bits, to a Viterbi decoder, thereby detecting the Multiple-Input Multiple-Output (MIMO) signals.

19. The system of claim 18, wherein the Multiple-Input Multiple-Output (MIMO) signals are Space Time Block Coded (STBC) signals.

20. The system of claim 18, wherein the Multiple-Input Multiple-Output (MIMO) signals are Hybrid Space Time Block Coded-Spatially Multiplexed (STBC-SM) signals.

21. The system of claim 18, wherein the constellation of symbols is a square constellation with gray mapping.

22. The system of claim 18, wherein the modified branch metric is determined as:

$$P(z_{n-k}/s_k = r_i, x_{n-k} = x) = \frac{1}{\sqrt{2\pi\tilde{\sigma}_{n-k}^2}} \exp\left(-\frac{|z_{n-k} - \langle r_{n-k}, [\hat{x}_i p_k]\rangle|^2}{2\tilde{\sigma}_{n-k}^2}\right)$$

wherein, $\tilde{\sigma}_{n-k}^2$ denotes modified noise variance corresponding to $(n-k)^{th}$ stream and 'k'=[0,1,2, ..., n−1].

23. The system of claim 18, wherein determining the path history vector ($p_k$) comprises determining equalized soft symbols ($\hat{x}_i$) using received data symbols ($\hat{z}_i$) and corresponding row vector of the matrix R, and wherein determining the equalized soft symbols ($\hat{x}_i$) comprises determining an effective noise ($w_i$) for fourth stage due to a soft symbol feedback.

24. The system of claim 23, wherein the set partitioning technique uses a set partitioning vector defined as [M, M,1,1 . . . 1(m−2) times] for the matrix R of order m×m.

* * * * *